United States Patent [19] [11] 4,280,270
Escher et al. [45] Jul. 28, 1981

[54] PROCESS FOR THE MANUFACTURE OF TANTALUM SOLID ELECTROLYTE CAPACITORS

[75] Inventors: Balint Escher; Dominique Prince; Jean Vasseux, all of Paris, France

[73] Assignee: Societe Lignes Telegraphics et Telephoniques, Paris, France

[21] Appl. No.: 50,800

[22] Filed: Jun. 21, 1979

[30] Foreign Application Priority Data

Jul. 28, 1978 [FR] France ............................... 78 22363

[51] Int. Cl.³ ............................................. H01G 9/00
[52] U.S. Cl. ......................................... 29/570; 29/584
[58] Field of Search .................. 29/570, 584; 361/311, 361/433

[56] References Cited

U.S. PATENT DOCUMENTS

| | | | |
|---|---|---|---|
| 2,923,051 | 2/1960 | Wellington | 29/570 |
| 3,137,058 | 6/1964 | Giacomello | 29/570 |
| 3,653,119 | 4/1972 | Fresia et al. | 29/585 |
| 4,067,786 | 1/1978 | Hilbert et al. | 204/56 R |

FOREIGN PATENT DOCUMENTS

| | | | |
|---|---|---|---|
| 474863 | 6/1975 | U.S.S.R. | 29/570 |
| 617789 | 7/1978 | U.S.S.R. | 29/570 |

*Primary Examiner*—Aaron Weisstuch

[57] ABSTRACT

Accelerated ageing of solid electrolyte tantalum capacitors in batches by immersion of the capacitors in a semiconducting powder contained in a conductive receptacle connected to one terminal of a d.c. voltage source, the other terminal of which is connected to the anode leads of the capacitors. The voltage of the source is between 1.2 and 1.8 the capacitor rated voltage. The receptacle is maintained between 25° C. and 180° C. Ageing lasts for at least two hours.

4 Claims, 6 Drawing Figures

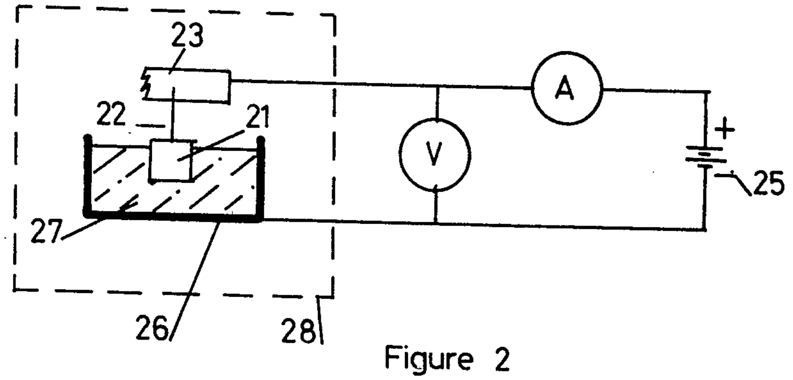
Figure 2
FIGURE 3
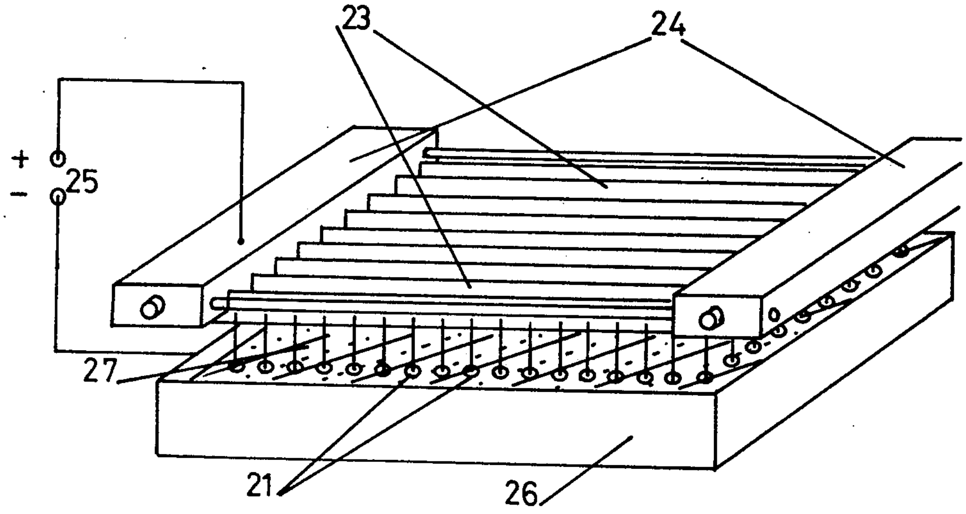

FIGURE 6

| | Measures before ageing | | | Measures after ageing | | | | |
|---|---|---|---|---|---|---|---|---|
| | If (µA) | C (µF) | Fd (%) | If (µA) | C (µF) | Fd (%) | ΔC in % at -55° | +85° |
| Con-ventional ageing | 1.5 | 16.- | 1.2 | 0.3 | 16.1 | 1.4 | 3.2 | 3.3 |
| | 2.7 | 15.5 | 1.2 | 0.6 | 15.6 | 1.3 | 3.2 | 3.5 |
| | 0.2 | 15.7 | 1.2 | 0.2 | 15.7 | 1.4 | 2.2 | 3.2 |
| | 0.2 | 16.5 | 1.3 | 0.1 | 16.5 | 1.3 | 3.6 | 3.2 |
| | 0.9 | 14.9 | 1.2 | 0.4 | 14.9 | 1.4 | 3.3 | 3.7 |
| at +25°C 70 V | 0.6 | 15.5 | 1.1 | 0.1 | 15.7 | 1.2 | 2.6 | 3.6 |
| | 0.7 | 15.5 | 1.1 | 0.3 | 15.7 | 1.2 | 2.7 | 4.2 |
| | 0.8 | 16.5 | 1.2 | 0.3 | 16.4 | 1.2 | 2.5 | 3.4 |
| | 0.7 | 15.7 | 1.1 | 0.2 | 15.8 | 1.2 | 2.3 | 3.2 |
| | 2.1 | 15.9 | 1.1 | 0.1 | 15.9 | 1.2 | 2.7 | 3.6 |
| at +110°C 65 V | 1.1 | 15.7 | 1.1 | 0.7 | 15.8 | 1.2 | 2.4 | 4.2 |
| | 0.5 | 15.9 | 1.1 | 0.4 | 15.7 | 1.1 | 2.8 | 3.7 |
| | 0.5 | 16.- | 1.1 | 0.5 | 16.- | 1.1 | 2.9 | 4.2 |
| | 0.3 | 15.8 | 1.1 | 0.3 | 15.7 | 1.2 | 2.4 | 3.4 |
| | 0.5 | 15.7 | 1.2 | 0.5 | 15.6 | 1.2 | 2.3 | 4.1 |
| at +150°C 56 V | 0.1 | 16.3 | 1.1 | 0.3 | 16.3 | 1.8 | 5.- | 5.5 |
| | 0.4 | 16.2 | 1.1 | 0.1 | 16.2 | 1.8 | 4.5 | 5.2 |
| | 0.8 | 15.7 | 1.3 | 0.2 | 15.9 | 1.7 | 3.5 | 4.2 |
| | 2.6 | 16.- | 1.2 | 0.6 | 16.1 | 1.9 | 5.1 | 5.- |
| | 0.9 | 16.2 | 1.2 | 0.3 | 16.3 | 1.7 | 4.3 | 5.6 |

PROCESS FOR THE MANUFACTURE OF TANTALUM SOLID ELECTROLYTE CAPACITORS

BACKGROUND OF THE INVENTION AND PRIOR ART

Ageing tantalum solid electrolyte capacitors is a big industrial problem, because this step, which is necessary for the production of high performance capacitors to which users have gradually become accustomed, accounts for an appreciable proportion of the production cost. Despite the accelerated ageing processes of current practice nowadays, this step is still lengthy and a duration of about twenty hours is usually considered necessary and this involves manipulations which give rise to heavy expenditure both from the viewpoint of labour and from the viewpoint of the necessary capital outlay. It is known to carry out an accelerated ageing by maintaining the capacitor under a direct voltage, while bringing it to a temperature close to or above the maximum temperature at which it is to operate. An example of such process is described in U.S. Pat. No. 3,495,311 assigned to International Standard Electric Corporation issued on Feb. 2, 1970, which describes an accelerated ageing under voltage, performed during the tinning step. U.S. Pat. No. 3,653,119, assigned to Sprague and filed on Dec. 28, 1967, describes an accelerated ageing under voltage which is to take place after the anode formation by immersion in a fused salt bath, the melting temperature of which is between 250° C. and 400° C. The applied voltage is about 0.15 times the anodizing voltage, which remains below 0.5 times the rated voltage. One advantage of the latter process resides in that it is a batch process, and it allows automatic protection of the anodes in the course of the treatment even if one of them proves to be defective (even short-circuited) as a result of the formation of a gaseous envelope around the defective part, which electrically insulates it from the molten bath. However such an ageing process is so complex that it is of very little use in production.

At present, it is usual to proceed with ageing of the anodes as follows: the anodes, after formation, are mounted on holders, in series with individual protective resistors, and then subjected to the following treatment:

4 hours at ambient temperature at 1.4 times the rated voltage with a series resistance of 10 kilohms 15 hours at 85° C. at rated voltage with a series resistance of 1 kilohm, that is to say, a total treatment duration of 19 hours, preceded by mounting of the anodes, taken one by one, on a carrier bar and changing over the protective resistors between the two operating stages. It is readily apparent from the foregoing brief description of the process that the ageing operation is costly both in capital outlay and in labour.

The present invention has essentially for its object to provide a process for accelerated ageing under voltage which utilizes the anodes mounted on the carrier bar used for the oxidizing stage, without requiring any particular manipulation in the ageing stage, the duration of which is reduced by a factor of about 10 in relation to the previously described process and which affords automatic protection of the neighbouring capacitors in the event of a defective anode without the need of any limiting resistor. It further has the advantage that it permits, in the course of the ageing, a self-healing of certain defective capacitors by reoxidation of the tantalum at the weak points.

BRIEF DESCRIPTION OF THE INVENTION

Accelerated ageing according to the invention is effected by immersing the anodes mounted on a carrier bar used in the formation step in a bed of pulverous semiconducting material, the anodes being brought to a temperature between 25° C. and 180° C. while being maintained at a direct voltage between 1.2 and 1.8 times the rated voltage of the capacitor for a period which is not less than two hours.

In a preferred variant of the invention, the semiconductor employed is an oxide and more particularly a metallic oxide exhibiting different possible degrees of oxidation.

The immersion of the anode carrier bars, as already mounted for the purpose of nitrate impregnation and formation, in a bed of pulverous semiconductor, makes it possible to dispense with the limiting resistors to be connected in series with each anode in the case of ageing under voltage. The bed, which is contained in a metallic receptacle connected to one of the terminals of the voltage source, of which the other terminal (the positive terminal) is connected to the carrier bar, performs the function of a limiting resistance for each of the anodes taken individually. Since the resistivity of most semiconductors decreases rapidly when the temperature increases, the protective resistance afforded by the bed therefore automatically takes a value depending upon the temperature. The value of the resistance in series with each anode depends upon the quantity of oxide powder and its grain size repartition.

The preferred use of a semiconductor of the oxide type in the ageing treatment according to the invention results from the fact that some of them are capable of changing spontaneously in their degree of oxidation as a function of the temperature with liberation of oxygen when the temperature rises. This is the case more particularly with manganese dioxide, which is reduced in accordance with the reaction $$2MnO_2 \longrightarrow Mn_2O_3 + \tfrac{1}{2} O_2 \nearrow$$

at 580° C. Emission of oxygen is detected from 300° C. upwards. This reaction is advantageous in the present case for two reasons: the resistivity of $MnO_2$ is relatively low (10 to 100 ohm-cm), while the resistivity of $Mn_2O_3$ is much higher ($10^4$ to $10^5$ ohm-cm) and the heating produces an emission of particularly reactive nascent oxygen. The first property results in the automatic switching off of a defective anode because in the event of a short-circuit (or near it) of one of the anodes, the high current which flows through the bed in the neighbourhood thereof creates a local temperature rise and a rapid decrease in the resistivity of the bed due to resistivity change of the dioxide; the phenomenon quickens and the temperature rise rapidly becomes sufficient to initiate the aforesaid reaction. The dioxide is therefore reduced in the neighbourhood of the defective part which is surrounded by highly resistive material and is insulated from the neighbouring parts. The simultaneous emission of oxygen permits, in some cases, a reoxidation of the defective anode analogous to a second formation.

The main advantages of the invention can therefore be summarized as follows:

reduction of the necessary capital outlay for equipment reduction of the duration of the ageing stage in a ratio of about 1 to 10 avoidance of the handling of the anodes before the ageing stage protection of the anodes close to a defective anode self healing of certain defective anodes during the ageing treatment.

BRIEF DESCRIPTION OF THE DRAWINGS

The invention will be more readily understood from the following description and from the accompanying figures which are given by way of non limiting illustration and in which:

FIG. 2 is a diagram of the ageing arrangement according to the invention,

FIG. 3 is a diagram of a batch of capacitors undergoing ageing,

FIG. 6 is a table summarizing the results of the measurements given by tests corresponding to the distributions of FIG. 5.

DETAILED DESCRIPTION OF THE INVENTION

Figure 1:
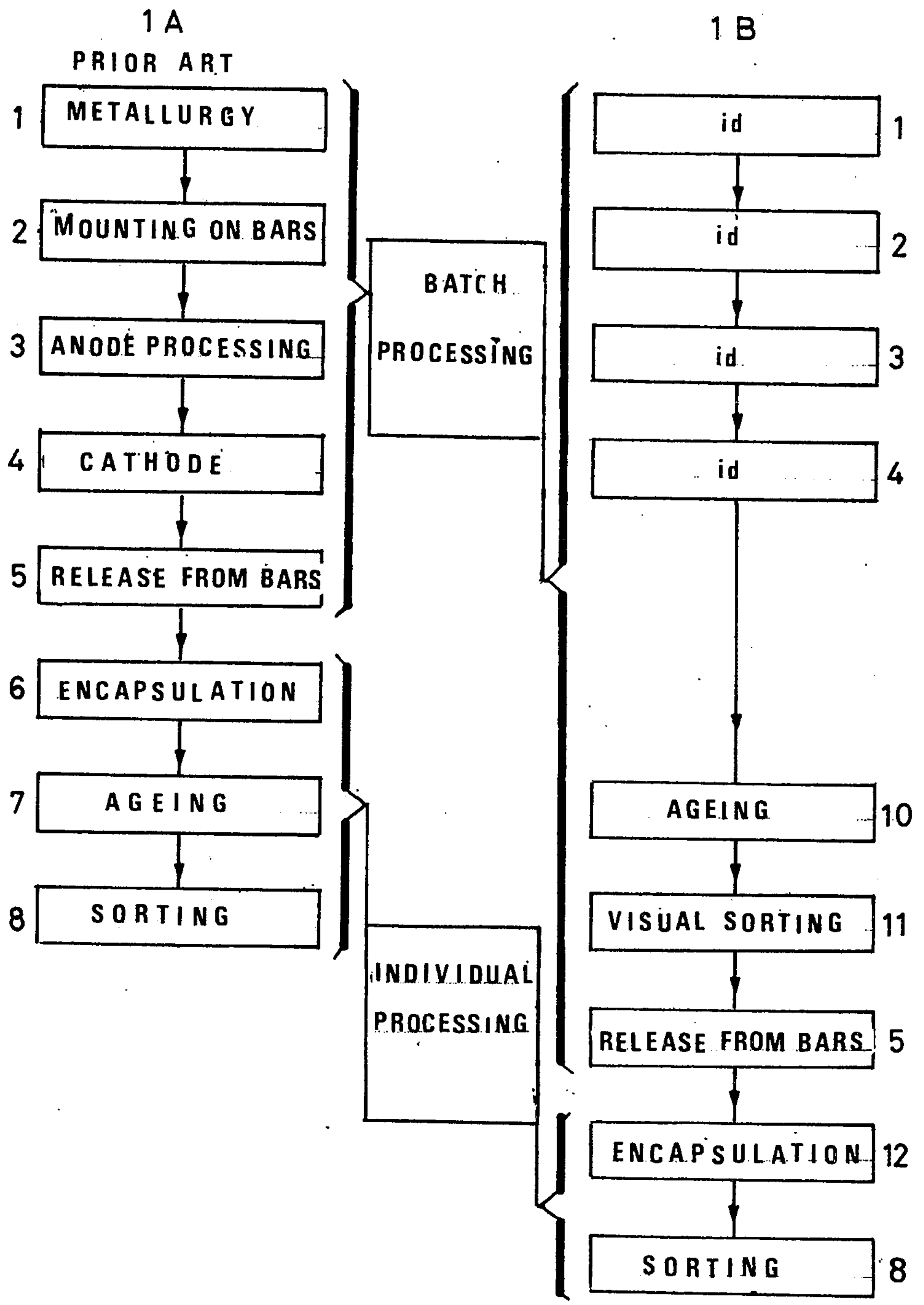
FIG. 1 is a block diagram of the process for the manufacture of capacitors.

FIG. 1 illustrates the stages of manufacture of capacitors according to the prior art (FIG. 1A) and according to the invention (FIG. 1B) respectively, from which the advantages of the latter will be readily appreciated.

There are successively illustrated the following common stages to both prior art and the invention (stage 1) manufacture of the anode by the technique of powder metallurgy. The sintered anodes are thereafter (stage 2) mounted on conductive bars or strips by soldering of the anode connection. Sometimes, the anodes are preoxidized in bulk before mounting as described, for example in U.S. Pat. No. 4,135,990 filed on Jan. 3, 1978 for: "Surface treatment of the anodes for tantalum capacitors". The bars are mounted on frames or racks which constitute the production units for the subsequent stages of production. Depending upon the dimensions of the anodes, a frame supports between several hundred and several thousand anodes. The subsequent operations are concerned with the oxidation, the impregnation with manganese nitrate and the pyrolysis of the latter (stage 3), which are repeated a number of times, followed by the forming of the cathode (stage 4) by graphiting and silvering, optionally followed by tinning of the silver coating. These four stages are common to the prior art and to the present invention.

In the case of metal encapsulated capacitors, the bars are thereafter removed from the frames and the capacitors are separated from the bars (stage 5) in order to be individually encapsulated (stage 6) and then individually mounted in the ageing rack (stage 7) comprising the individual resistors for the protection of each capacitor. The ageing is usually carried out at two different temperatures and lasts twenty hours, as stated in the foregoing. The ageing rack necessitating the change-over of the individual protective resistors is a relatively complex apparatus and the individual mounting of the capacitors in the rack is a lengthy operation. The defective capacitors are thereafter eliminated (stage 8) by sorting.

In the process according to the invention, the capacitors, after processing of the cathode (stage 4), are maintained in the frames and the latter are transferred to the ageing station (stage 10), where the anodes are immersed in a bed of semiconductor material and subjected to the ageing treatment as hereinafter explained in greater detail. Thereafter, the capacitors are sorted (stage 11) by simple visual inspection and released from the strips (stage 12). Only the sound capacitors are encapsulated (stage 12). A final sorting is effected similar to stage 8 of the prior art. In the case of capacitors having plastic encapsulation, the latter is applied directly to the capacitors mounted on the frames. It will be seen from FIG. 1 that the ageing is an operation carried on the individual capacitors in the case of the prior art, while it is an operation carried on a batch in the case of the invention.

FIGS. 2 and 3 diagrammatically illustrate the ageing operation according to the invention. The capacitors, such as 21, are connected by their positive pole (tantalum wire 22) to a strip 23 of stainless steel or a bar supporting from 10 to 60 anodes depending upon their size (see FIG. 3). These strips are combined in transfer racks 24 (see FIG. 3) of 20, 40 or 80 strips, depending on the size of the anodes. The rack is the production unit during all the subsequent manufacturing operations, as is explained in the foregoing.

In the course of stage 10, the strip is connected to the positive terminal of a stabilized voltage source 25 by way of a recording ammeter A. The second terminal of the source 25 is connected to a receptacle 26 containing a bed 27 of semiconductor material into which capacitors 21 are dipped. A voltmeter V displays the voltage across the terminals of 25. A ventilated oven, diagrammatically represented by the chain line 28, maintains the capacitors at the preset temperature. In a preferred variant, ageing is carried out by maintaining the voltage of the source 25 at between 1.2 and 1.8 times the rated value and the temperature at between 25° C. and 180° C., the treatment being continued for at least two hours. The semiconductor bed 27 consists of manganese dioxide having a grain size of less than 350 μm, the anodes being immersed over two-thirds of their height. In order to obtain the effect of individual limiting resistor for the anodes, the distance between the immersed end of the anode and the receptacle 26 is to be about one centimeter. The pressure resulting from the weight of the rack is sufficient to ensure electrical contact between the anodes and the bed. Current recording is continued throughout the ageing duration. At the end of the operation, the rack is withdrawn from the oven and the supply is switched off. A sorting may be carried out visually, whereby it is possible to eliminate the short-circuited capacitors or capacitors having a strong leakage current, since they have changed in appearance; these parts, which have been heated to a temperature above the melting temperature of the tin or the stability temperature of the resin contained in the silvering coating, have often changed colour, while in other cases grains of the semiconductor bed have adhered to the anodes which have been overheated in the course of the ageing.

Figure 4:
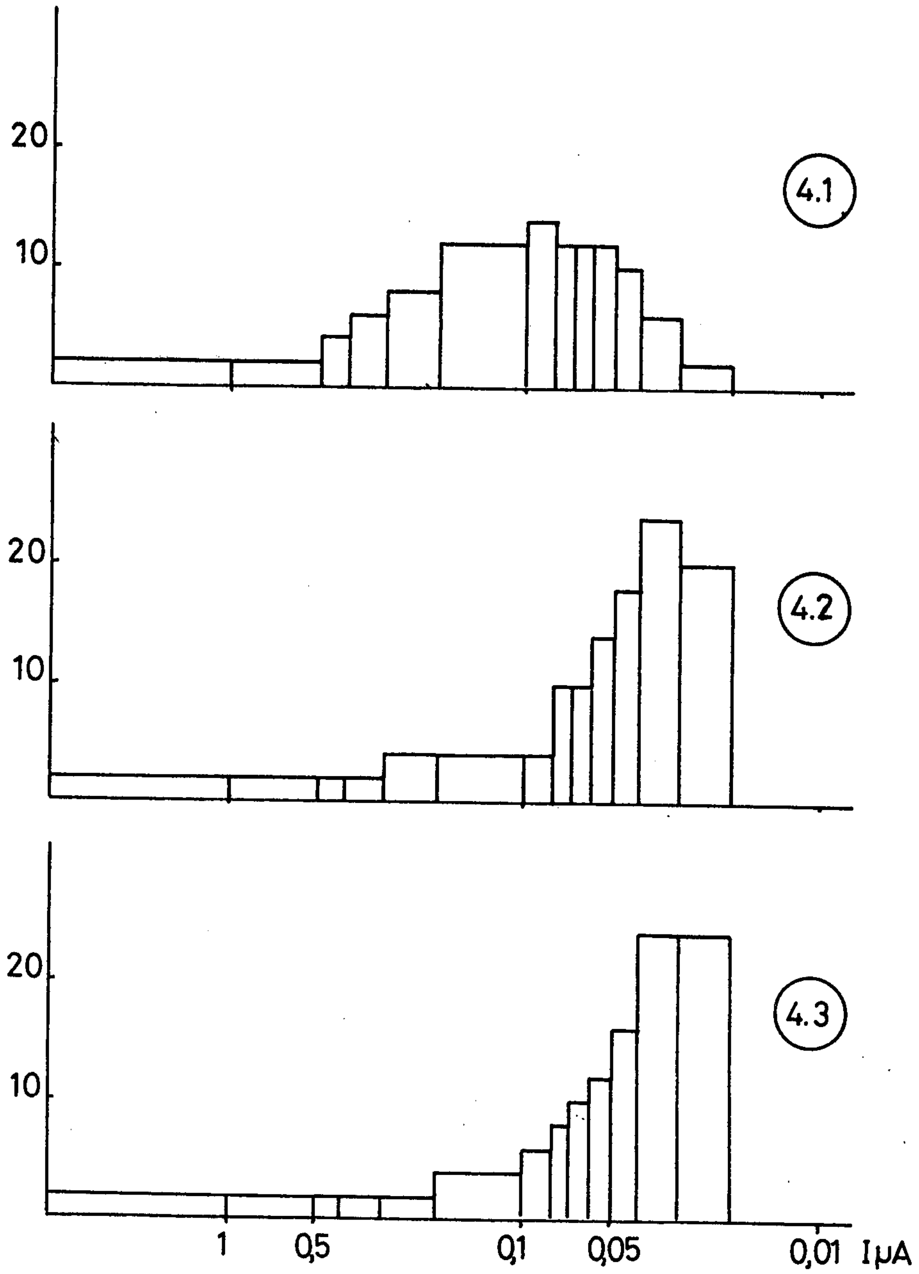
FIG. 4 contains three distributions of capacitors as a function of the leakage current for comparing the ageing according to the prior art with that according to the invention, FIG. 5 contains four distributions of capacitors as a function of the leakage current permitting comparison of the influence of the ageing on a bed at different voltages and temperatures.

FIG. 4 illustrates the distribution of the leakage currents (curve 41) before and (curve 42) after ageing according to the prior art and (curve 43) after the ageing carried out in accordance with the invention. The conditions of the ageing corresponding to the distribution 43 are the following: heating of the capacitors on a rack at 150° C. after immersion over two-thirds of their height in a manganese dioxide bed, as explained in the foregoing, for two hours. Examination of the curves 41, 42, 43 and more particularly 42 and 43 shows that the accelerated ageing according to the present invention is equivalent to that of the prior art in regard to the leakage current, because it will be seen that (curve 42) 64 capacitors have a leakage current of less than 0.05 μA after ageing according to the prior art and (curve 43). 62 capacitors have a leakage current below the same value after aging according to the invention, the two batches which have served for comparison being taken from a common production run. The corresponding number is 18 before ageing (curve 41).

Figure 5:
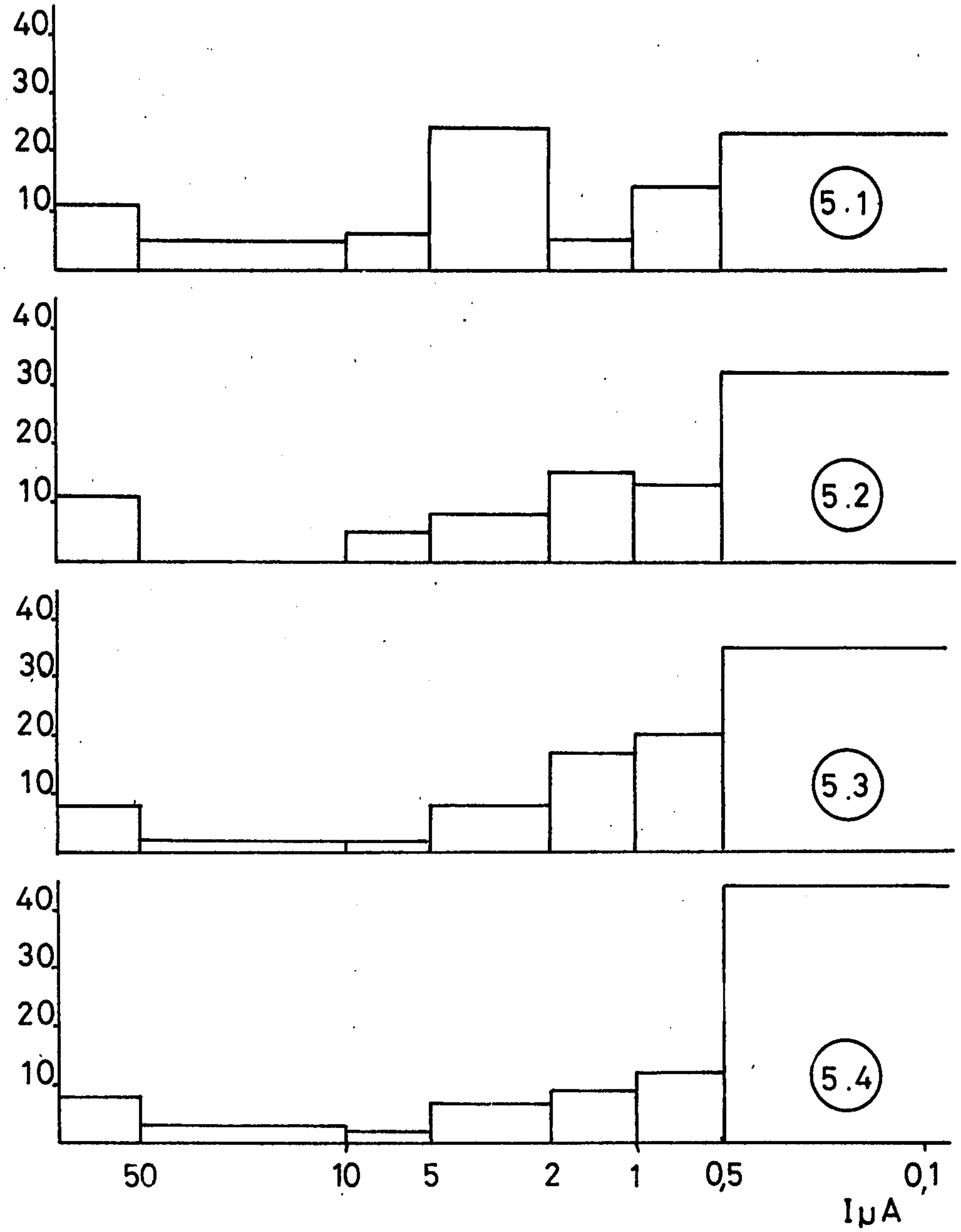

FIGS. 5 and 6 show the influence of the parameters temperature and voltage on the ageing treatment, the duration having arbitrarily been maintained at the minimum value of two hours so as to reduce the total manufacturing time. The histograms of FIG. 5 correspond to batches of capacitors taken from a common production run of 22 μF—40 V capacitors treated in the following manner:

batch No. 1 (curve 51) capacitors aged by the process according to the prior art batch No. 2 (curve 52) capacitors treated at 25° C. for two hours at 1.75 times the rated voltage (70 V)

batch No. 3 (curve 53) capacitors treated at 110° C. for two hours at 1.6 times the rated voltage (65 V)

batch No. 4 (curve 54) capacitors treated at 150° C. for two hours at 1.4 times the rated voltage (56 V).

The distribution ranges over the leakage currents as in the preceding figure.

Comparison of the values of the parameters shows that the results are substantially constant. It will be seen that an increase in the temperature substantially increases the number of capacitors having a leakage current in the lowest range.

The table of FIG. 6 shows the values of the parameters of typical capacitors of the four batches, where If is the leakage current Fd is the dissipation factor and ΔC is the variation of the capacitance between −55° C. and +85° C. and 25° C. respectively.

FIGS. 5 and 6 show that the number of capacitors with a leakage current lower than 0.5 μA changes from 32 to 44 when the ageing temperature changes from 25° C. to 175° C.

In the foregoing, a manganese dioxide bed has been used. Other semiconductors have also given good results, as shown by the following examples:

Example No. 1 - control sample (ageing according to the prior art) Treatment at 85° C. at the rated voltage for 15 hours (10 μF - 40 V capacitors)

| Before ageing | | | After ageing | | |
|---|---|---|---|---|---|
| If | Fd | $\Delta C^T$ | If | Fd | $\Delta C^T$ |
| .2 | 2.1 | 5.5 | .45 | 2 | 5.3 |
| .7 | 1.5 | 5.3 | .2 | 1.5 | 5.3 |
| .1 | 1.4 | 5.2 | .04 | 1.5 | 5.2 |
| .1 | 1.5 | 5.7 | .05 | 1.5 | 5.1 |

-continued

Example No. 1 - control sample (ageing according to the prior art) Treatment at 85° C. at the rated voltage for 15 hours (10 μF - 40 V capacitors)

| Before ageing | | | After ageing | | |
|---|---|---|---|---|---|
| If | Fd | $\Delta C^T$ | If | Fd | $\Delta C^T$ |
| .9 | 1.9 | 5.9 | .25 | 1.5 | 5.5 |

Example No. 2 - Ageing in a ZnO bed at 150° C. for two hours at 1.4 times the rated voltage (10 μF - 40 V capacitors)

| If | Fd | $\Delta C^T$ | If | Fd | $\Delta C^T$ |
|---|---|---|---|---|---|
| .5 | 2.1 | 5.8 | .45 | 2 | 5.9 |
| .2 | 1.7 | 5.9 | .18 | 1.7 | 6.1 |
| .1 | 1.4 | 5.6 | .09 | 1.4 | 5.5 |
| .09 | 1.8 | 5.8 | .07 | 1.7 | 5.5 |
| .05 | 1.7 | 5.5 | .04 | 1.8 | 5.3 |
| 1.5 | 1.9 | 5.3 | 1.2 | 1.8 | 5.1 |

Example No. 3 - Ageing in a graphite bed at 150° C. for two hours at 1.4 times the rated voltage (10 μF - 40 V capacitors)

| If | Fd | $\Delta C^T$ | If | Fd | $\Delta C^T$ |
|---|---|---|---|---|---|
| .2 | 1.7 | 5.3 | .07 | 1.5 | 4.9 |
| .5 | 2 | 5.8 | .1 | 1.8 | 5.1 |
| .09 | 1.8 | 5.1 | .03 | 1.7 | 4.3 |
| .1 | 1.4 | 5.7 | .05 | 1.4 | 5.2 |
| .3 | 1.6 | 5.9 | .1 | 1.4 | 5.3 |
| 1 | 1.7 | 5.3 | 1.2 | 1.3 | 4.7 |

Example No. 4 - Ageing in the $MnO_2$ bed at 150° C. for two hours at 56 V (10 μF - 40 volt capacitors)

| Before ageing | | | After ageing | | |
|---|---|---|---|---|---|
| If | Fd | $\Delta C^T$ | If | Fd | $\Delta C^T$ |
| .2 | 1.7 | 5.8 | .06 | 1.5 | 5 |
| .3 | 2 | 5.9 | .07 | 1.7 | 5.5 |
| .1 | 1.8 | 5.6 | .03 | 1.6 | 5.3 |
| .09 | 1.7 | 5.7 | .035 | 1.5 | 5.3 |
| .08 | 1.8 | 5.7 | .045 | 1.4 | 5.5 |
| .08 | 1.7 | 5.5 | .04 | 1.4 | 5.2 |

Example No. 5 - Ageing in the $MnO_2$ bed at 150° C. for two hours at 56 V (2.2 μF - 40 V capacitors)

| If | Fd | If | Fd |
|---|---|---|---|
| .03 | 2.2 | .016 | 1.8 |
| .74 | 2.1 | .012 | 1.4 |
| .036 | 1.7 | .015 | 1.3 |
| 1.70 | 1.5 | .22 | 1.2 |
| 80 | 1.9 | .52 | 1.4 |
| .5 | 2 | .03 | 1.5 |

It is of interest to note here that the curves recording the variation of the current in the course of the ageing show cases of self healing of capacitors.

For example, in Example No. 5, the capacitor corresponding to the penultimate line exhibits a leakage current of 80 μA before ageing; this current is reduced to 0.52 μA after ageing.

What we claim:

1. Process for accelerated ageing of tantalum solid electrolyte capacitors, characterized in that the capacitors mounted on a strip production unit are immersed in a bed of pulverous semiconducting material contained in a conductive receptacle connected to the negative terminal of a stabilized voltage source, of which the positive terminal is directly connected to the strip to which the anodes of the capacitors are fixed, the voltage of the said source being between 1.2 and 1.8 times the rated voltage of the capacitors, and the said mounting being maintained between 25° C. and 180° C. for a minimum period of two hours.

2. Process for accelerated ageing tantalum solid electrolyte capacitors according to claim 1, wherein the said bed consists of a semiconducting oxide.

3. Process for ageing tantalum solid electrolyte capacitors according to claim 2, wherein the said bed consists of manganese dioxide.

4. Process for ageing tantalum solid electrolyte capacitors according to claim 3, wherein the temperature is 150° C. and the applied voltage is 1.4 times the rated voltage.

* * * * *